United States Patent [19]
Hughes

[11] Patent Number: 6,110,374
[45] Date of Patent: *Aug. 29, 2000

[54] TREATMENT PROCESS FOR REMOVING MICROBIAL CONTAMINANTS SUSPENDED IN WASTEWATER

[75] Inventor: Paul A. Hughes, Rockton, Ill.

[73] Assignee: Aqua-Aerobic Systems, Inc., Rockford, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/107,960

[22] Filed: Jun. 30, 1998

[51] Int. Cl.$^7$ ....................................................... C02F 1/52
[52] U.S. Cl. ............................ 210/638; 210/702; 210/728
[58] Field of Search ..................................... 210/702, 721, 210/725, 727, 728, 754, 764, 638, 639, 651

[56] References Cited

U.S. PATENT DOCUMENTS 4,081,365  3/1978  White et al. ................................. 210/3
4,090,965  5/1978  Fuchs ....................................... 210/151
4,173,532  11/1979  Keoteklian ............................... 210/725

(List continued on next page.)

FOREIGN PATENT DOCUMENTS 0 413 178 A2  2/1991  European Pat. Off. .
3628203 A1    2/1988  Germany .

OTHER PUBLICATIONS

Aqua–Aerobic Systems, Inc., AquaDisk Filter Cloth–Media Filters Brochure, Bulletin #600A, p. 1, Apr. 1996.
Mecana Umwelttachnik AG, Mecana Disk Filter Description, section 3, Sep. 1991.
Waterloo Biofilter Process/Product Description, http://darcy.uwaterloo.ca/partners/biofilter no date.
Aqua–Aerobic Systems, Inc., Aqua Filter Brochure, Copyright 1993, Bulletin No. 100M Jan. 1993.
Aqua–Aerobic Systems, Inc., AquaDisk Filter Cloth–Media Filters Brochure, Copyright 1996, Bulletin #600A Apr. 1996.
Huyck Austria Material Sheet, Type WE 134 no date.
Mecana SA. Schmerikon, Specification Sheet, Filtercloths, Type 102 no date.
Osmonics, Inc., Scale Sheet, P/N 17978, Copyright, 1984.
Mecana Brochure, Functions of Disk Filter no date.

(List continued on next page.)

Primary Examiner—David A. Simmons
Assistant Examiner—Frank M. Lawrence
Attorney, Agent, or Firm—Michael Best & Friedrich LLP

[57] ABSTRACT

A treatment process is disclosed for reducing the concentration of pathogenic microorganisms in a volume of wastewater that contains a substantial concentration of pathogenic microorganisms less than about 10 microns in size, less than about 5 microns in size, and less than about 0.1 microns in size. The process includes adding an agglomerate-promoting agent, such as a coagulant chemical, to the volume of wastewater such that the solids aggregates form in the volume of wastewater and include the pathogenic microorganisms. The volume of wastewater is then passed through a filter cloth membrane to separate greater than about 50.0% of the pathogenic microorganisms less than 10 microns in size from the volume of wastewater, to separate up to about 99.9% of the pathogenic microorganisms less than about 5 microns in size, and to separate up to about 99% of the pathogenic microorganisms less than about 0.1 microns in size. The filter cloth membrane used is constructed of random web needled polyester felt characterized by a free passage size through the filter cloth membrane of greater than about 5 microns. More specifically, the treatment process can separate greater than about 50.0% and up to about 99.9% of protozoan pathogens such as Cryptosporidium and Giardia from the volume of wastewater.

41 Claims, 3 Drawing Sheets

U.S. PATENT DOCUMENTS

| | | | |
|---|---|---|---|
| 4,229,202 | 10/1980 | Mullerheim et al. | 71/8 |
| 4,238,334 | 12/1980 | Halbfoster | 210/679 |
| 5,006,251 | 4/1991 | Takeishi et al. | 210/618 |
| 5,128,040 | 7/1992 | Molof et al. | 210/605 |
| 5,362,401 | 11/1994 | Whetsel | 210/741 |
| 5,374,360 | 12/1994 | Weis | 210/780 |
| 5,407,572 | 4/1995 | McGuire et al. | 210/259 |
| 5,407,573 | 4/1995 | Hughes | 210/266 |
| 5,429,750 | 7/1995 | Steele | 210/751 |
| 5,456,836 | 10/1995 | Jeffery et al. | 210/508 |
| 5,512,076 | 4/1996 | Gibson | 55/498 |
| 5,543,056 | 8/1996 | Murcott et al. | 210/728 |
| 5,552,057 | 9/1996 | Hughes et al. | 210/668 |
| 5,707,524 | 1/1998 | Potter | 210/606 |
| 5,711,887 | 1/1998 | Gastman et al. | 210/748 |
| 5,725,770 | 3/1998 | Henry | 210/603 |
| 5,733,455 | 3/1998 | Molof et al. | 210/605 |
| 6,027,649 | 2/2000 | Benedek et al. | 210/639 |

OTHER PUBLICATIONS

Fundamentals of Chemistry for Enviromental Engineering, Colloidal Dispersions in Liquids Article, pp. 332–339 no date.

Mecana Disk Filter Description, Sep. 5, 1991.

Ashland Chemical, Inc., The Role of Polymers in Liquid/Solids Separation, Apr. 28, 1992, PYM–TP–5 no date.

Zeta–Meter, Inc., Everything You Want to Know About Coagulation & Flocculation, Apr., 1993.

Coagulation and Flocculation, Chapter 8, The Nalco Water Handbook, pp. 8.3–8.23 and 4.28 no date.

TREATMENT PROCESS FOR REMOVING MICROBIAL CONTAMINANTS SUSPENDED IN WASTEWATER

BACKGROUND OF THE INVENTION

The present invention relates generally to a wastewater treatment process and, more particularly, to a process for removing microbial contaminants, including pathogenic microorganisms, contained in wastewater.

Pathogenic microorganisms are disease-causing agents that can contaminate domestic and recreational water supplies through the discharge of poorly treated industrial and municipal wastewater. Pathogenic microorganisms transmitted in this manner can cause major health problems to local communities and is often a causative factor in outbreaks of dysentery, cholera, typhoid, gastroenteritis, and other diseases. To minimize the chances of such outbreaks occurring, effluent standards are imposed on facilities which discharge treated wastewater into the environment.

Most pathogenic microorganisms can be classified as protozoan, bacteria, and viruses. The viruses of particular concern to wastewater treatment are water-borne polio viruses, including rota viruses. Bacteria comprise the largest group of pathogenic microorganisms and include Salmonella sp., Shigella sp., *Escherichia coli*, and a broad variety of others generally known. The most common bacteriological diseases include shigellosis, which causes dysentery, food poisoning, and cholera. Protozoan pathogens include Giardia sp. which causes giardiasis, one of the most prevalent water-borne diseases in the United States, and Cryptosporidium sp., which causes dysentery.

The treatment processes employed in wastewater treatment may be categorized as primary, secondary, and tertiary. In typical primary treatment, larger suspended solids are removed from raw wastewater using mechanical means and/or by gravity settling. In secondary treatment, biological treatment processes may be employed to metabolize organic matter to solid material and byproducts, followed by the removal of solid matter, usually by gravity settling. Secondary treatment may also include biological nutrient removal. Treatment beyond secondary treatment is commonly referred to as tertiary treatment. More recent tertiary treatment processes have employed physical-chemical or biological processes followed by chemical precipitation to lower the concentration of pathogenic microorganisms and other fine suspended solid particles in secondary-treated wastewater.

Filtration techniques are also used in some tertiary treatment processes. More specifically, granular media type filters such as deep-bed sand filters are used to strain out fine particles from the wastewater stream prior to disinfection. The degree to which these filters can separate pathogenic microorganisms from a wastewater stream varies with respect to the type of pathogenic microorganisms in the stream and, more particularly, to the size of the microorganisms. While most bacteria are about 10 microns or less in size, most protozoans are less than 5 microns and most viruses are less than 0.1 microns. The use of granular media type filters has proven more effective in removing some larger particles from wastewater streams than in removing small particles such as viruses. Deep bed multi-media filters have been employed to remove up to 30% to 40% of viruses and bacteria from a given volume of wastewater.

Despite prior treatment efforts, outbreaks of diseases continue to be linked to water-borne pathogenic microorganisms contaminating domestic water supplies and recreational water supplies. These occurrences have generated increasing pressure on responsible authorities to implement effluent standards which further reduce the concentrations of microbial contaminants, including pathogenic microorganisms, that can be discharged in treated industrial and municipal wastewater. Various treatment techniques are available for improving the degree to which microbial contaminants can be removed from a wastewater stream. These treatment techniques vary in cost, complexity, as well as in effectiveness.

Filtration techniques, particularly the use of sand filters and other granular-media type filters, may be advantageous as a tertiary treatment process because these techniques typically involve a simple operation and can be very cost effective compared to most chemical and biological processes. However, there is a general perception in the wastewater treatment industry that the effectiveness of filtration techniques to remove microbial contaminants, including pathogenic microorganisms, from wastewater cannot be substantially improved beyond the removal rate or degree currently achievable with sand filters and other granular media type filters.

SUMMARY OF THE INVENTION

It is a principal object of the present invention to provide a wastewater treatment process that employs a filtration technique capable of reducing the concentration or amount of microbial contaminants, including pathogenic microorganisms, in a given volume of wastewater by at least about 30% to 40% and more preferably, up to over about 99% to 99.9%. Such a reduction or removal rate is a vast improvement to the 30% to 40% rates presently achievable with prior art filtration processes. It is a further object of the invention to provide such a process that is particularly adapted to the tertiary treatment of wastewater (e.g., secondary effluent).

The invention provides a treatment process for reducing the concentration of microbial contaminants suspended or contained in wastewater. The process includes providing a volume of wastewater that contains a substantial concentration of suspended microbial contaminants (e.g., in excess of about $10^2/100$ ml) including pathogenic microorganisms and then promoting the agglomeration of suspended solids in the wastewater to form suspended solids aggregates which include microbial contaminants. Agglomeration of solids aggregates may be promoted by adding an agglomerate-promoting agent such as a coagulant and/or flocculant to the volume of wastewater. The volume of wastewater including the solids aggregates is then passed through a filter membrane or filter media, thereby separating microbial contaminants from the wastewater. The filter membrane may be constructed from a cloth material, preferably needled polyester felt having a random web construction and characterized by an average free passage through the filter membrane of greater than about 5 microns.

In one aspect of the invention, the step of passing the volume of wastewater through the filter membrane separates greater than about 50% of the microbial contaminants (e.g., pathogenic microorganisms) from the volume of wastewater. The volume of wastewater may also contain a substantial concentration of microbial contaminants or microorganisms less than about 10 microns (e.g., protozoan, bacteria, and/or viruses) or less than about 5 microns in size (e.g., protozoan and/or viruses). In an unexpected manner, the step of passing the volume of wastewater through the filter membrane has been found to separate greater than about 50% (and up to greater than about 99.9%) of such microbial contaminants from the volume of wastewater.

Further, the volume of wastewater may contain a substantial concentration of microbial contaminants less than about 0.1 microns in size (e.g., in excess of 0.05/100 ml), including, but not limited to viruses. In an unexpected manner, the step of passing the volume of wastewater through the filter membrane has been found to separate greater than about 50% (and up to greater than about 99%) of such microbial contaminants from the volume of wastewater.

Before embodiments of the invention are explained in detail, it is to be understood that the invention is not limited in its application to the details of the apparatus, composition or concentration of components, or to the steps or acts set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION

The wastewater treatment process according to the invention is particularly adapted to the treatment of wastewater containing a substantial concentration of microbial contaminants including pathogenic and non-pathogenic microorganisms less than about 30 microns in size. In one aspect of the invention, the process is employed in the treatment of wastewater containing in excess of about $10^2/100$ ml of microbial contaminants generally including pathogenic microorganisms such as protozoans, bacteria, and viruses. Wastewater generated in municipal and agricultural facilities, as well as sewage and some industrial wastewater, generally contain a substantial concentration (e.g., about $10^6$ to $10^9/100$ ml) of suspended microbial contaminants. One focus of the invention is on the treatment of these types of wastewater. Another focus of the invention is on the treatment of secondary effluent which contains a substantial concentration (e.g., in excess of about $10^2/100$ml) of microbial contaminants, including pathogenic microorganisms.

The wastewater treatment process according to the invention is also employed in the removal of microbial contaminants that are less than about 10 microns in size (e.g., most bacteria, protozoans, and viruses) or less than about 5 microns in size (e.g., protozoan pathogens such as Cryptosporidia sp. and Giardia sp., and viruses). In another significant although unexpected aspect of the invention, the process is employed in the removal of microbial contaminants that are less than about 0.1 microns in size (e.g., viruses). Therefore, another focus of the invention is on the treatment of wastewater containing microbial contaminants that are less than about 10 or 5 microns in size and/or microbial contaminants that are less than about 0.1 microns in size.

Figure 1:
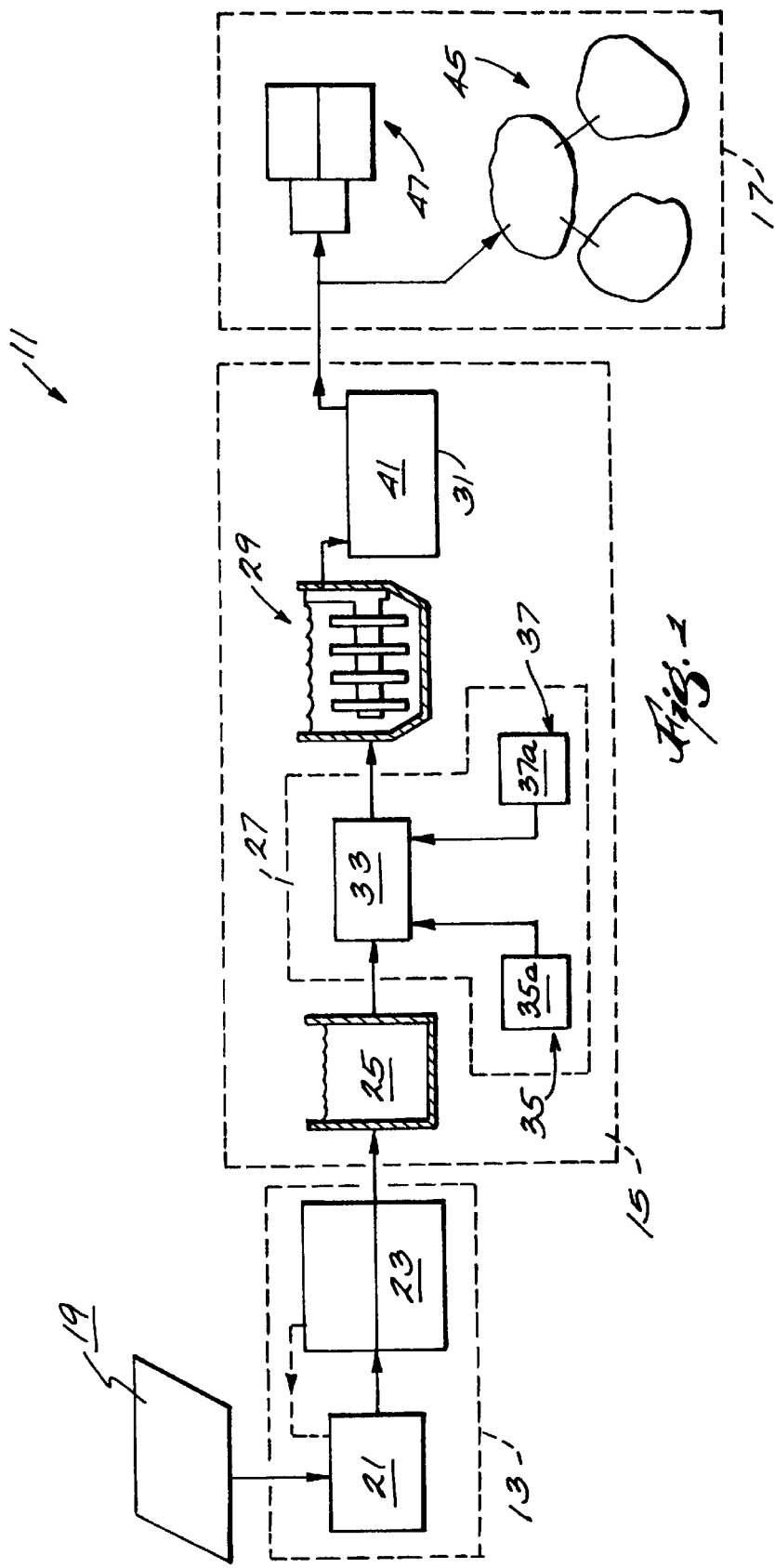
FIG. 1 is a schematic of a wastewater treatment system capable of employing a treatment process according to the invention.

FIG. 1 illustrates one embodiment of a wastewater treatment system 11 that can employ a treatment process according to the invention. The wastewater system 11 shown includes a primary-secondary treatment zone 13, a tertiary treatment zone 15, and an effluent discharge and distribution zone 17. The wastewater system 11 receives raw wastewater 19 and discharges treated wastewater fit for discharge into the natural environment and/or for reuse. Although the system shown and discussed below operates in a continuous manner, it should be understood that this system, or other systems embodying the invention, may operate in a batch mode.

In the primary-secondary treatment zone 13, raw wastewater is received by a conventional primary treatment facility 21 and acted on to remove larger solids contaminants. The primary treatment facility 21 may include a rack and rake system or some other screening device to mechanically separate larger solids from the wastewater. Further, the raw wastewater 19 may be received in settling ponds wherein solids can separate from the wastewater by gravity. Raw wastewater 19 received in the primary treatment facility 21 contains, in addition to larger solids particles, a significant amount of very fine particles suspended or dissolved in the liquid portion of the wastewater. As discussed above, sewage wastewater and other wastewater containing organic wastes typically contain significant concentrations of microbial contaminants less than about 30 microns in size (i.e., about $10^6$ to $10^9/100$ ml). Among these will be pathogenic microorganisms less than 10 microns in size, such as protozoans, bacteria, viruses, and some parasites. The majority of these pathogenic microorganisms (i.e., typically up to about $10^7$ to $10^8/100$ ml) remain in the wastewater even after primary treatment.

From the primary treatment facility 21, the primary treated wastewater is sent to a conventional secondary treatment facility 23 to further lower the total suspended solids (TSS) and the biochemical oxygen demand (BOD) in the wastewater and, thus, reduce the concentration of pathogenic microorganisms. A typical secondary treatment facility 23 may include a digester, gravity settling ponds and/or a sequencing batch reactor wherein different activated sludge processes are employed.

The primary and secondary treatments of raw wastewater typically produce effluent still containing a substantial concentration (i.e., typically up to about $10^2$ to $10^6/100$ ml) of microbial contaminants including pathogenic microorganisms. The benefit of the invention is most appreciated when the effluent from the primary and secondary treatments of raw wastewater contains in excess of about $10^2/100$ ml microbial contaminants, and more appreciated when the effluent from the primary and secondary treatment of raw wastewater contains between about $10^4/100$ ml to $10^6/100$ ml microbial contaminants.

From the secondary treatment facility 23, the treated wastewater may be returned to the primary treatment facility or discharged into the tertiary treatment zone 15. The tertiary treatment zone 15 depicted in FIG. 1 includes an equalization basin 25, a pre-filtering facility 27, a filter apparatus 29, and a disinfecting facility 31. Primary-secondary treated wastewater discharged into the tertiary treatment zone 15 is first received in the equalization basin 25. The equalization basin 25 provides for further separation of heavier solids from the liquid portion of the wastewater and allows the primary-secondary treated wastewater to reach equilibrium.

The pre-filtering facility 27 includes an agglomeration contactor or vessel 33 that is fluidly connected on an inlet side with the equalization basin 25, and also with a first chemical addition system 35 and a second chemical addition system 37. The agglomeration vessel 33 is positioned between the equalization basin and the filter apparatus 29 and can accommodate the flow or transfer of wastewater from the equalization basin 25 to the filter apparatus 29. In the agglomeration vessel 33, generally known methods are employed to promote the agglomeration of suspended solids in the wastewater to form suspended solids aggregates that include microbial contaminants. As will be further shown below, the effectiveness of the filter apparatus 29 to remove such suspended solids and other microbial contaminants from the wastewater is enhanced by promoting the agglomeration of solids prior to filtering. It should be noted, however, that the structure of the agglomeration vessel 33 is partly dependent upon the method of agglomeration used.

In a preferred process of the invention, filter-aid agents are added to the wastewater as the wastewater is passed through the agglomeration vessel 33. The agglomeration vessel 33 illustrated in FIG. 1 is an elongated mixing basin 33 that is separately fluidly connected to the first and second chemical addition systems 35, 37. As will be recognized by one skilled in the art, most known chemical addition systems will be workable in the current system as long as such systems are capable of adding filter-aid agents to the wastewater in the agglomeration vessel 33, 25 as needed (and when needed) to promote formation of the solids aggregates. For example, the agglomeration vessel 33 may not be a tank or other vessel, but a section of conduit between the equalization basin 25 and the filter apparatus through which the wastewater flows and into which filter-aid agents are added. Other structures generally known in the art may also be used. Further, the addition of filter-aid agents into the agglomeration vessel 33 may occur in a one step, or multi-step process, and may occur by manual or by automated methods generally known.

FIG. 1 illustrates chemical addition systems 35, 37 which are automated, and which include a reservoir 35a, 37a for retaining a supply of a filter-aid agent. Each chemical addition system 35, 37 also includes a conduit interconnecting the reservoir 35a, 37a with the agglomeration vessel 33, and a pump (not shown) for selectively transferring amounts of filter-aid agents into the agglomeration vessel 33. Further, each of the reservoirs 35a, 37a may include a static mixer (not shown) for producing a generally homogeneous mixture of filter-aid agent, and to aid in the preparation of a filter-aid agent.

The filter-aid agents are agglomeration-promoting agents such as coagulants, flocculants, or other chemicals or mixtures generally known to aid in the bringing together of small solid or semi-solid particles in the wastewater and forming clumps or masses of particles that may be more effectively removed by filtration. Preferred filter-aid agents include coagulants, flocculants, solutions or mixtures containing coagulants or flocculants, and mixtures thereof that are generally known for use in the agglomeration of suspended solids in wastewater. The terms coagulation and flocculation, and likewise coagulant and flocculant, are often used interchangeably, but may be better understood if seen as two different mechanisms. More specifically, coagulants are chemicals which de-stabilize the solids in colloidal suspension by neutralizing the repulsive forces that keep the solids apart and allow the suspended solids to group together. Flocculants, on the other hand, are chemicals which physically bridge between the suspended solids to help form large filterable flocs (i.e., solids aggregates). Many coagulants known for use in wastewater treatment systems can perform both coagulant and flocculant functions by neutralizing surface charges, and adsorbing onto more than one colloid to form a bridge between them.

Most known coagulants for use in wastewater treatment and which are not detrimental to the filtration process are usable in the current invention. Coagulants usable in the present invention include, but are not limited to, inorganic coagulants, including iron salts, aluminum salts, activated silica, and bentonite, and preferably aluminum sulfate (alum). Additional usable coagulants include indifferent electrolytes, such as sodium chloride, and organic polyelectrolytes, preferably cationic polyelectrolytes. Examples of cationic polyelectrolyte coagulants include, but are not limited to: polyethyleneamine, quaternized polyamines, epichlorohydrin-dimethylamine, diallydimethyl-ammononium chloride, polyethylene imine, and polyalkalene polyamine.

Most flocculants known for use in wastewater treatment are usable in the current invention as long as they are not detrimental to the filtration process. Usable flocculants include, but are not limited to, aluminum sulfate, lime, ferric chloride, and other iron salts, polyelectrolytes, and mixtures thereof. Usable flocculants also include, but are not limited to, organic polymers such as cationic polyelectrolytes, anionic polyelectrolytes, and non-ionic polymers. Examples of usable cationic polyelectrolytes include, but are not limited to, acrylamide/diallyldimethy-lammonium chloride copolymer, acrylamide/amine copolymer, and Mannich polymer. Examples of usable non-ionic polyelectrolytes include, but are not limited to, polyacrylyamide and polyethylene oxide. Examples of anionic polymers include hydrolyzed polyacrylamide and acrylamide/acrylate copolymer.

Generally, the amount of filter-aid agents added to the wastewater is dependent upon many factors including: the type of filter-aid agent used, the general wastewater chemistry, the amount of total suspended solids in the wastewater, the flow rate of the wastewater through the agglomeration vessel 33, and other factors appreciated by those skilled in the art. Agglomeration of suspended solids in wastewater using coagulants and flocculants is generally known by those skilled in the art, and known methods and dosages of adding coagulants and flocculants to the wastewater are usable in the current invention.

In a preferred process of the invention as illustrated in FIG. 1, two distinct filter-aid agents or mixtures of filter-aid agents are added to the wastewater in the agglomeration vessel 33: a first filter-aid agent that acts primarily as a coagulant, and a second filter-aid agent that acts primarily as a flocculant. The first filter-aid agent is added to the agglomeration vessel 33 by the first chemical addition system 35, and the second filter aid agent is added to the agglomeration vessel 33 by the second chemical addition system 37. In a more preferred embodiment, the first filter-aid agent is granular aluminum sulfate (alum). The alum is preferably put into an aqueous mixture for ease of addition into the wastewater. The first filter-aid solution is preferably added to the agglomeration vessel 33 such that it is present in a concentration of between about 2 mg and about 10 mg (2 to 10 ppm) per liter of wastewater flowing through the agglomeration vessel 33, and more preferably about 10 mg/L of wastewater (10 ppm). The second filter-aid chemical is preferably an organic polymer flocculants such as a mixture commercially available under the trademark Cytec Superfloc A-130. The second filter-aid chemical is preferably put into an aqueous mixture for ease of addition into the wastewater. The second filter-aid agent is added to the agglomeration vessel 33 at a rate such that between about 0.5 mg and about 3 mg (0.5 to 3 ppm) of the second filter-aid agent is added per liter of wastewater flowing through the agglomeration vessel 33, and more preferably about 1 mg/L (1 ppm).

In adding the filter-aid agents to the agglomeration vessel 33, it is advantageous to thoroughly mix the filter-aid agents with the wastewater. In this regard, it may be advantageous to use a mixing apparatus in the agglomeration vessel 33, such as a static mixer, a turbine or propeller type impeller, or the like. Preferably, the agglomeration vessel 33 is a complete mixing basin or a reaction basin having close to an ideal plug flow or constant flow. Moreover, the contact time or residence time of each of the filter-aid agents with the wastewater in the agglomeration vessel 33 should be sufficient to allow for the desired agglomeration effect. In a preferred embodiment, the average contact time of the coagulant is about 0.5 to about 3 minutes (preferably about 2 minutes), and the average contact time of the flocculant is between about 0.5 to about 2 minutes (preferably about 1 minute).

Figure 2:
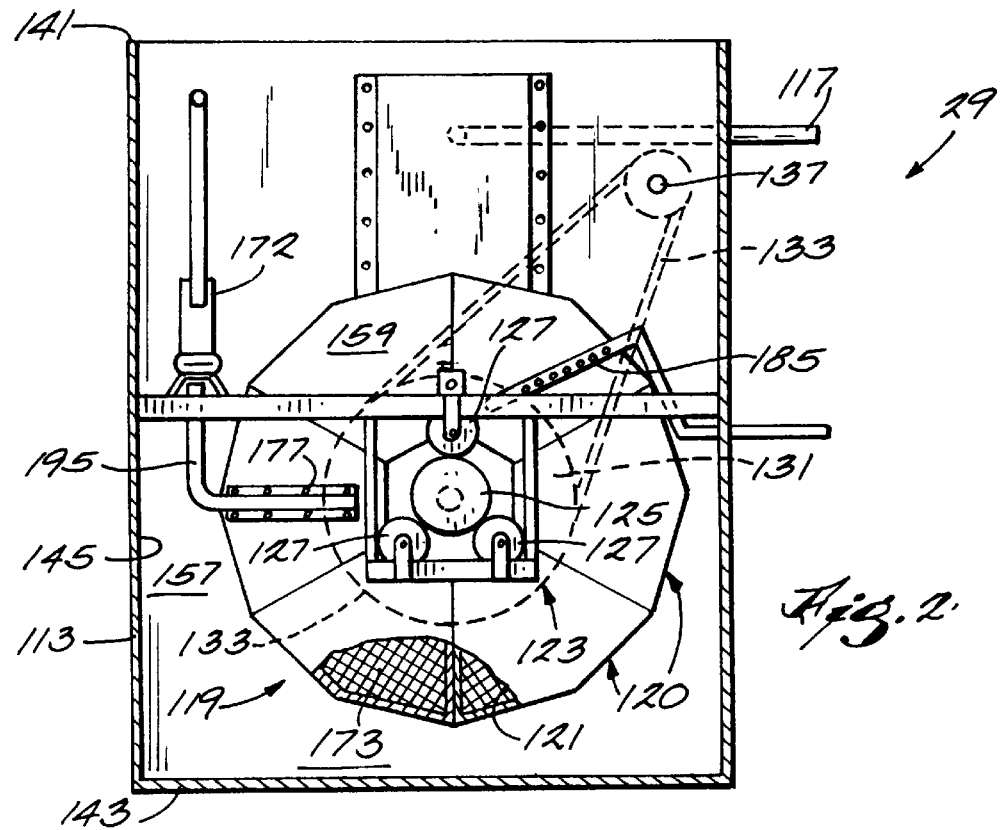
FIG. 2 is a side view of a filter apparatus in the wastewater treatment system.
Figure 3:
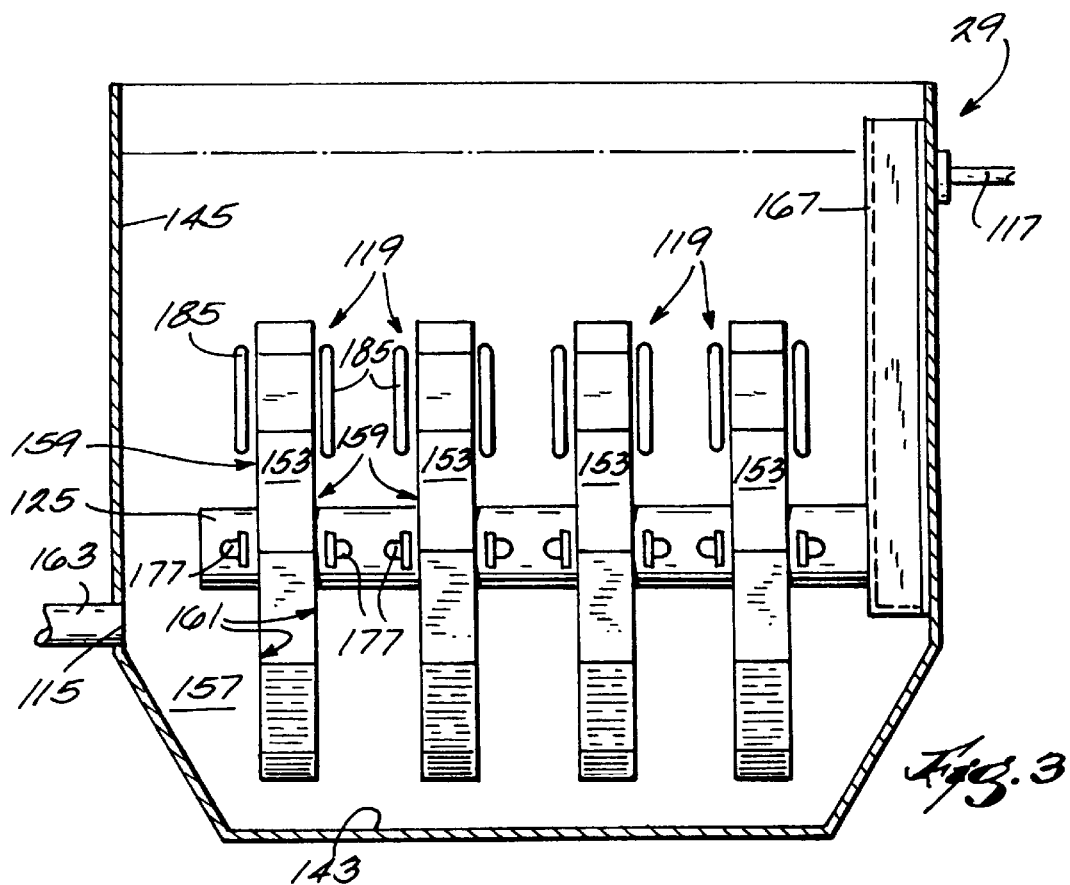
FIG. 3 is a front view of the filter apparatus.

The tertiary treatment zone 15 further includes one or more filter apparatus 29 through which wastewater from the pre-filtering zone is passed to separate or remove the solids aggregates and other fine particles from the wastewater stream. Referring to FIGS. 2 and 3, the filter apparatus 29 may include a filter tank 113 having an influent inlet 115 and an effluent outlet 117, and a plurality of rotatable filter disks 119 disposed between the influent inlet 115 and the effluent outlet 117. Each of the filter disks 119 supports filter media, membrane or material 121 through which the influent wastewater is passed. The filter apparatus 29 depicted in FIGS. 2 and 3 includes four filter disks 119, but the filter tank 113 may be sized, in alternative embodiments, to hold more than four filter disks 119 or fewer filter disks 119, depending on the particular filtering demand of the wastewater treatment process.

Referring to FIG. 2, the filter disks 119 are generally vertically disposed and spaced apart in parallel relation. The filter disks 119 are supported by, and fixed to, a horizontally disposed hollow drum 125 that is supported for rotation about its central longitudinal axis by a mounting assembly 123. The mounting assembly 123 is comprised of at least three rollers 127 which engage an outer surface of the hollow drum 125 and allow the hollow drum 125 and the filter disks 119 to be rotated about a horizontal central longitudinal axis of the drum 125. A sprocket 131 encircles the hollow drum 125, and a chain drive 133 drivingly engages the sprocket 131. The chain drive 133 is adapted to be driven by a motor assembly 137 for rotating the hollow drum 125 and filter disks 119.

The filter tank 113 is formed by a hoppered bottom 143, upwardly extending side walls 145, and an open top 141. A first drain outlet (not shown) is provided near the bottom 143 and is operable to remove solids accumulation from the tank 113. A second drain outlet (not shown) is positioned in one of the side walls 145 and is operable to lower the liquid level in the tank 113. The filter tank 113 further includes an influent chamber 157 defined by the liquid retaining space inside the filter tank 113 that is outside of the material 121 and four effluent chambers 153 defined by the spaces within or partially enclosed by the filter material 121. As depicted in FIG. 2, each filter disk 119 has a pair of outer surfaces or influent surfaces 159 which face the influent chamber 157, and a pair of parallel spaced apart inner surfaces or effluent surfaces 161 which face the effluent chamber 153.

Figure 4:
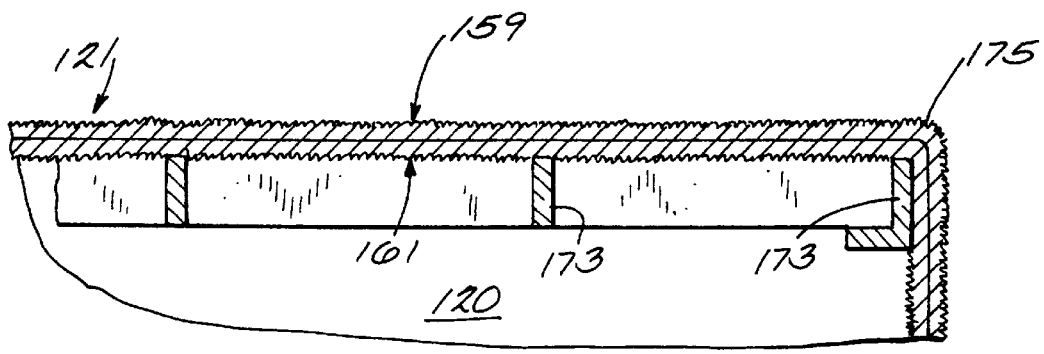
FIG. 4 is a cross-sectional view through a filter disk of the filter apparatus.

The filter disks 119 are preferably formed by a plurality of removable filter sectors 171 that are mounted about the hollow drum 125. Each filter sector 171 includes a grid-type frame 173 which supports the filter material 121. Preferably, the filter cloth material 121 is in the form of a bag that is fitted over, and supported by, the grid frame 173. Referring to FIG. 4, the filter cloth material 121 is preferably made of one or more layers of two to six mm thick needled polyester felt. Each layer may be formed by conventional means, for example, by pressing 50 cm thick polyester fabric comprised of very fine fiber particles about 50 microns or less in diameter and then needling the pressed fabric to reorient fiber particles in the vertical or transverse direction. A supporting weave 175 is arranged in the middle of the layer. As a result of the needled felt process, the polyester fibers form a multi-layer random web structure lacking in consistent straight-through or transversely disposed pores between adjacent fibers. The needled polyester felt filter material 121 has an average free (or unencumbered) passage between polyester fibers and through the filter material 121. Preferably, the free passage of the filter material 121 is in the range of about 5 microns to 10 microns, while the space percentage of the solid particles in the filter material 121, including the polyester fiber, amounts to about ten to fifteen percent.

Suitable Filter disks 119 equipped with filter material 121 having an average free passage or flow through size of 5 microns for use in the present invention is commercially available from Aqua-Aerobic Systems, Inc. of Rockford, Ill. under the designation Filter Disk 101. Suitable filter disks 119 including filter material 121 having an average free passage or flow through size of 10 microns for use in the present invention is also commercially available from Aqua-Aerobic Systems, Inc. under the designation Filter Disk 102.

Wastewater containing suspended solids aggregates formed in the pre-filtering zone, including microbial contaminants, may be supplied to the filter tank 113 by gravity feed or by a pump (not shown) through an influent supply line 163. The wastewater enters the influent chamber 157 and then passes through the filter material 121 of the filter disks 119. As the wastewater stream passes through the filter material 121, the path of suspended solids is hindered by polyester fibers in the web structure causing the solids to be caught in between adjacent fibers or to adhere to the fibers themselves. Due to the random web structure of the filter material 121, individual flowlines in the stream carrying the suspended solids will typically deviate from a straight-through path through the filter material 121, thereby increasing the chances of the suspended solids (i.e., the solids aggregates) being caught in the filter material 121, regardless of the size of the solids.

The filter material 121, in combination with the process of the present invention, is capable of separating a greater amount of pathogenic microorganisms than has previously been accomplished with other wastewater filtration techniques. More specifically, the process according to the invention which includes the steps of promoting the agglomeration of suspended solids in a reference volume of wastewater and passing the wastewater, including the solids aggregates formed therein through the filter material, removes greater than about 50% of microbial contaminants, including pathogenic microorganisms, from the reference volume of wastewater. Preferably, the process removes greater than 90%, more preferably greater than 99%, and most preferably, greater than 99.9% of microbial contaminants, including pathogenic microorganisms, from the reference volume of wastewater.

In a significant aspect of the present invention, the process removes microbial contaminants that are less than about 10 microns in size, and, alternatively, microbial contaminants that are less than about 5 microns in size. Preferably, the process removes greater than about 50% of microbial contaminants that are less than about 10 microns or less than about 5 microns in size from the reference volume of wastewater. More preferably, the process removes greater than about 90%, more preferably greater than about 99%, and most preferably, greater than about 99.9% of microbial contaminants that are less than about 10 or 5 microns in size from the reference volume of wastewater.

In another significant, and unexpected aspect of the invention, the treatment process removes microbial contaminants that are less than about 0.1 microns in size. Preferably, the process according to the invention removes greater than about 50% of microbial contaminants that are less than about 0.1 microns in size from the reference volume of wastewater. More preferably, the invention removes greater than 90%, and most preferably greater than 99% of microbial contaminants that are less than about 0.1 microns in size from the reference volume of wastewater.

The reference volume of wastewater may also contain a substantial concentration of pathogenic microorganisms (e.g., protozoans, bacteria, and viruses) that are less than about 5 microns in size. In such cases, the process according to the invention separates greater than about 50%, greater than about 90%, and even greater than 99.9% of such pathogenic microorganisms from the reference volume of wastewater.

Further, the volume of wastewater may contain a substantial concentration of pathogenic microorganisms less than about 0.1 microns in size, including, but not limited to viruses, and the process according to the invention separates greater than about 50%, greater than about 90%, greater than about 99%, and even greater than 99.9% of such pathogenic microorganisms from the volume of wastewater.

In more specific terms, the reference volume of wastewater may contain protozoan pathogens including Cryptosporidium sp. and Giardia sp., and the step of passing the volume of wastewater (including the solid aggregates) through the filter membrane may separate greater than about 50%, more preferably greater than about 90%, and more preferably greater than 99.9% of the Cryptosporidium sp. and Giardia sp. from the reference volume of wastewater. The wastewater may also contain viruses, and the step of passing the volume of wastewater through the filter membrane may separate greater than about 50%, more preferably greater than about 90%, and more preferably greater than about 99.9% of the viruses from the reference volume of wastewater.

The removal or reduction rates described above may be achieved using a process preferably employing a needled polyester felt filter material 121 having an average free passage size of 5 microns, or greater than 5 microns (i.e., 10 microns). Moreover, such removal or reduction rates may be achieved using a process wherein the wastewater is passed at least once or a greater number of times through the filter material 121.

It is common in the art of wastewater treatment to refer to removal or reduction of microbial populations in terms of log removal rather than in percent removal. The following Table 1 represents a conversion of percent removal into terms of log removal, and gives examples of populations that remain after a certain log removal occurs upon an initial population of microorganisms.

TABLE 1

| Log Removal | Percent Removal | Initial Population of Microorganisms | | | |
|---|---|---|---|---|---|
| | | 100 | 1,000 | 100,000 | 1,000,000 |
| 1 | 90 | 10 | 100 | 10,000 | 100,000 |
| 2 | 99 | 1 | 10 | 1,000 | 10,000 |
| 3 | 99.9 | 0.1 | 1.0 | 100 | 1,000 |
| 4 | 99.99 | 0.01 | 0.1 | 10 | 100 |
| 5 | 99.999 | 0.001 | 0.01 | 1 | 10 |
| 6 | 99.9999 | 0.0001 | 0.001 | 0.1 | 1 |

The use of the present invention to treat wastewater having a significant initial concentration of microbial contaminants preferably results in at least one log reduction in the amount of microbial contaminants in the wastewater. More preferably, a log reduction of 2, and more preferably, a log reduction of 3 is obtained. Additionally, the use of the present invention also preferably results in at least one log reduction in the amount of microbial contaminants that are less than about 5 microns in size, and more preferably a log reduction of at least 2 or 3 is obtained for microbial contaminants that are less than about 5 microns in size. Additionally, the use of the present invention also preferably results in at least one log reduction in the amount of microbial contaminants that are less than about 0.1 microns in size, and more preferably, a log reduction of at least 2 is obtained for microbial contaminants that are less than about 0.1 microns in size.

After passing through the filter material 121, the filtered wastewater flows into the effluent chamber 153 and then into hollow drum 125. From the hollow drum 125, the filtered wastewater flows into a rising conduit 167 and out of the filter tank 113 through the effluent outlet 117. The effluent outlet 117 is typically positioned at a level adjacent the uppermost portions of the filter disks 119.

The filter disks 119 may be cleaned periodically of filtered solids and biogrowth on the filter material 121 using either a backwash system or a spray wash system. The backwash system includes a backwash pump 172, suction piping 195 and a plurality of suction heads 177 positioned nearly adjacent the influent surfaces of the filter material. During a backwash operation, the suction heads 177 engage the influent surfaces 159 of the filter material 121 such that the flexible filter material 121 conforms to the suction heads 177 and draw filtered water from the effluent chambers 157 through the filter material 121 in a direction reverse of the normal filtering direction. The resulting backwash stream removes the filtered solids (including microbial contaminants) from the filter material 121 and carries the dislodged solids with backwash water to a discharge conduit (not shown) for discharge at a location (not shown) external of the filter tank 113. Meanwhile, the filter disks are rotated by energizing motor 137 and driving sprocket 131 through drive chain 133. In this manner, essentially all of the influent surfaces 159 of the filter material 121 is brought into contact with the suction heads 177.

The spray wash system includes a high-pressure pump (not shown) connected to four pairs of spray nozzles or nozzle heads 185. Each nozzle head 185 is positioned nearly adjacent the influent surface 159 of the filter material 121. When actuated, the high-pressure pump delivers a liquid stream at high pressure to each of the nozzle heads 185 and each nozzle head 185 directs a high velocity liquid stream against the influent surface 159 of the filter material 121. The liquid stream acts to wash the influent surface 159 and to remove solids and other fine particles including microbial contaminants that accumulate thereon. The liquid stream also penetrates the influent surface 159 to impact and dislodge filtered solids entrained within the filter material 121. In an alternative arrangement, the nozzle heads 185 can be positioned inside the effluent chambers 157 to direct liquid streams in opposite directions against portions of the effluent surfaces 161.

Other aspects of the filter apparatus 29 and their operation are also discussed in U.S. Pat. Nos. 5,362,401 and 5,374,360, both of which are assigned to the assignee of the present invention. U.S. Pat. Nos. 5,362,401 and 5,374,360 are hereby incorporated by reference.

In many treatment systems, before leaving the treatment facility, the treated wastewater is disinfected using a disinfecting agent such as chlorine. In this regard, it is advantageous to remove as much of the suspended solids prior to chlorine treatment since the solids tend to absorb chlorine and, thus, increases the amount of chlorine required for disinfection. Over-chlorination is not only expensive but can be harmful to the environment when chlorine is discharged at high levels.

Referring to FIG. 1, in the embodiment shown, the effluent or filtrate discharged from the filter apparatus is sent to a conventional disinfecting facility 31. Typically, the disinfecting facility 31 will include a chlorination tank 41 wherein chlorine is added to the filtrate for sterilization. Due to the effectiveness of the filtration process according to the invention, the filtrate contains a minimal concentration of total suspended solids, and therefore does not adsorb 25 as much of the chlorine as in prior art processes. Accordingly, the process requires only a minimal amount of chlorine to disinfect a volume of wastewater. After the wastewater is treated in the disinfection system, it is discharged by a discharge and distribution system as conventionally known.

The discharge and distribution system may simply entail discharging the treated water from the disinfection system 41 through a conduit directly into the environment, such as into a pond, lake, river, or simply onto the ground. Other discharge systems, such as leach fields 45, perforated piping, evaporation basins 47, or other systems generally known may be used.

The following examples are intended to exemplify embodiments of the invention and are not to be construed as limitations thereof.

EXAMPLE

A series of test examples were performed to evaluate the removal of enteric viruses and protozoan parasites using a treatment system embodying the current invention. A bench scale filter apparatus including a needled polyester felt filter membrane was set up and tested for its ability to remove microbial contaminants from wastewater. The filter apparatus used comprised an elongated tube having upper tube portion and a lower tube portion which were separated by a needled polyester felt filter membrane. The filter membrane was supported by a support ring.

A volume of wastewater was prepared and passed through the filter apparatus. In particular, a sample volume of wastewater was obtained from the Roger Road sewage treatment plant in Tucson, Ariz.. The Tucson plant treats domestic sewage by a combination of activated sludge and biotowers. The sample volume of wastewater was secondary effluent collected after the clarifiers and before disinfection in the Tuscon plant.

Because of the usually low concentration of viruses in secondary sewage and the difficulty in measuring such low concentrations, vaccine strain coliphage MS-2 was added to the wastewater in the influent mixing tank to a concentration of approximately $10^7$/liter in a five-gallon sample volume of the wastewater. The MS-2 coliphage was grown and assayed in *Escherichia coli* ATCC 15597 by the PFU method. It is of a similar shape and size to poliovirus and has been used in numerous studies to evaluate water and wastewater treatment. Further, it is often used to evaluate filtration devices because of its poor absorption to surfaces and, thus, is considered a "worst case" model of virus removal by filtration.

Giardia cysts are usually present in secondary sewage at concentrations ranging from 50–200/liter and Cryptosporidium oocysts at concentrations of 10–50/liter which are great enough concentrations to be detected in 1–2 liter sample volumes. Enough Giardia cysts were present in the wastewater to assess a 99% removal by the filters. However, a lower level of Cryptosporidium oocysts required that they be added to better assess filter performance. Live Cryptosporidium oocysts were obtained from infected calves and purified by density gradient centrifugation in sucrose. The purified Cryptosporidium oocyst were then added to the wastewater before filtration or addition of the filter-aid agents producing substance.

A series of four tests were run using this system wherein a volume of wastewater was prepared and passed through the filter apparatus by gravity feed from the upper tube portion to the lower tube portion. In each test, the concentration of certain microbial contaminants in the influent and the effluent were measured and compared.

In the first series of tests, Filter Type 101 having a 5 micron flow through or free passage size was used on the filter apparatus, and no filter aid agents were used. In the second series of tests, Filter Type 101 was again used, but filter-aid agents (FAA) including an alum coagulation agent was added to the wastewater at a concentration of about 10 ppm, for a contact time of about 2 minutes. Then, an organic polymer flocculant was added to the wastewater at a concentration of about 1 ppm for a contact time of about 1 minute.

In the third series of tests, Filter Type 102 having a 10 micron flow through or free passage size was used on the filter apparatus, and no filter-aid agents were used. In the fourth series of tests, Filter Type 102 was used, and filter aid agents including an alum coagulation agent was added to the wastewater at a concentration of about 10 ppm, for a contact time of about 2 minutes. Then, an organic polymer flocculant was added to the wastewater at a concentration of about 1 ppm for a contact time of about 1 minute.

In each series of test runs, 10 ml samples for coliphage analyses were collected before and after filtration and compared to determine removal of the viruses by the filter system. Removal of Giardia sp. cysts and Cryptosporidium sp. oocysts was determined by direct assay of the wastewater before and after filtration. One liter samples before and after filtration were collected and centrifuged for 10 minutes at 1,400×g to pellet the cysts and oocysts. The organisms were resuspended in 10 ml of distilled water containing 0.1% Tween 80. They were then passed through membrane filters and stained with fluorescent labeled monoclonal antibodies and examined under a UV light microscope as described in the *Manual of Environmental Microbiology* for the presence of oocysts and cysts.

The following tables illustrate the results of the series of testing, indicating the performance of the current invention to remove microbial contaminants from wastewater. The Filter Type column indicates the type of filter material used, wherein 101 indicates a filter material on a filter disk(s) commercially available from Aqua-Aerobics Systems, Inc. (discussed previously) and 102 indicates a filter disc(s) also commercially available from Aqua-Aerobics Systems, Inc. (also discussed previously). The Filter Type column also indicates whether a filter aid agent (FAA) was used wherein "with FAA" indicates the use of a filter aid agent, and "no FAA" indicates that no filter aid agent was used. The remaining columns indicate the influent and effluent concentration of the relevant microbial contaminant being measured, and the percent reduction obtained.

| Filter Type | Influent | Effluent | Percent Reduction |
|---|---|---|---|
| Cryptosporidium Reduction Results are given as oocysts/mL | | | |
| 101 FAA | $8.69.10^3$ | 13 | 99.85 |
| 101 No FAA | $9.21 \times 10^4$ | $8.65 \times 10^3$ | 90.61 |
| 102 FAA | $5.36 \times 10^3$ | 11.1 | 99.79 |
| 102 No FAA | $2.09 \times 10^6$ | $5.75 \times 10^3$ | 99.72 |
| Giardia Reduction Results are given as oocyst/mL | | | |
| 101 FAA | $2.29 \times 10^3$ | <1 | >99.9 |
| 101 No FAA | $3.34 \times 10^2$ | 17 | 94.91 |
| 102 FAA | $2.29 \times 10^3$ | 2.1 | 99.9 |
| 102 No FAA Giardia | $3.75 \times 10^2$ | 19 | 94.93 |
| MS-2 Reduction in Wastewater Results are given as PFU/mL | | | |
| 101 With FAA | $1.89 \times 10^6$ | $3.38 \times 10^4$ | 98.21 |
| 101 No FAA | $2.33 \times 10^6$ | $1.92 \times 10^6$ | 17.17 |
| 102 With FAA | $1.89 \times 10^6$ | $1.29 \times 10^4$ | 99.32 |
| 102 No FAA | $1.61 \times 10^6$ | $1.83 \times 10^6$ | No Reduction |

While some embodiments of the invention are shown in the drawings and discussed above, alternate embodiments will be apparent to those skilled in the art and are within the intended scope of the present invention. Therefore, the invention is to be limited only by the following claims:

What is claimed is:

1. A process for reducing the amount of microbial contaminants in wastewater, the process comprising the acts of:
    providing wastewater containing microbial contaminants;
    promoting the agglomeration of microbial contaminants in the wastewater; and
    filtering the wastewater including the agglomerated microbial contaminants through a filter membrane made of cloth material to separate at least a portion of the microbial contaminants from the wastewater.

2. The process of claim 1 wherein said at least a portion is greater than about 50%.

3. The process of claim 1 wherein said at least a portion is greater than about 99%.

4. The process of claim 1 wherein the microbial contaminants include microorganisms less than about 10 microns in size.

5. The process of claim 1 wherein the microbial contaminants include microorganism less than about 5 microns in size.

6. The process of claim 1 wherein the microbial contaminants contain microorganisms less than about 1.0 micron in size.

7. The process of claim 1 wherein the microbial contaminants include microorganisms less than about 0.1 micron in size.

8. The process of claim 1 wherein the microbial contaminants include viruses.

9. The process of claim 1 wherein the microbial contaminants include protozoans.

10. The process of claim 1 wherein the microbial contaminants include bacteria.

11. The process of claim 1 wherein the filter membrane made of cloth material includes a random web needled polyester felt.

12. The process of claim 1 wherein the filter membrane is characterized by an average free passage through the filter membrane of greater than about 5 microns.

13. The process of claim 1 wherein the promoting act includes adding an agglomerate-promoting agent.

14. The process of claim 13 wherein the agglomerate-promoting agent includes a coagulant.

15. The process of claim 13 wherein the agglomerate-promoting agent includes one of ferric chloride or alum.

16. The process of claim 1 wherein the promoting act includes adding a coagulant to the wastewater and adding a flocculent to the wastewater.

17. The process of claim 16 wherein the flocculent includes an organic polyelectrolyte.

18. A process for reducing the concentration of pathogenic microorganisms in wastewater, the process comprising the acts of:
    providing wastewater containing a concentration of pathogenic microorganisms including at least one of protozoans, bacteria, and viruses;
    adding an agglomeration-promoting agent to the wastewater to form solids aggregates which include the pathogenic microorganisms; and
    filtering the wastewater through a filter membrane made of cloth material to reduce the concentration of pathogenic microorganisms in the wastewater.

19. The process of claim 18 wherein in the filtering step, the concentration of pathogenic microorganisms is reduced by greater than about 50%.

20. The process of claim 18 wherein in the filtering step, the concentration of pathogenic microorganisms is reduced by greater than about 90%.

21. The process of claim 18 wherein in the filtering step, the concentration of pathogenic microorganisms less than about 10 microns in size is reduced by greater than about 50%.

22. The process of claim 18 wherein in the filtering step, the concentration of pathogenic microorganisms less than about 5 microns in size is reduced by greater than about 50%.

23. The process of claim 18 wherein in the filtering step, the concentration of viruses is reduced by greater than about 50%.

24. The process of claim 18 wherein the protozoans include Cryptosporidium and Giardia and wherein in the filtering step, the concentration of Cryptosporidium and Giardia are reduced by greater than about 50%.

25. The process of claim 18 wherein the filter membrane made of cloth material includes random web needled polyester felt.

26. The process of claim 18 wherein the filter membrane is characterized by an average free passage size through the filter membrane of greater than about 5 microns.

27. The process of claim 18 wherein in the adding step, a coagulant is added.

28. The process of claim 27 wherein the coagulant is selected from iron salts, aluminum salts, activated silica, bentonite, sodium chloride, cationic polyelectrolytes, or mixtures thereof.

29. The process of claim 18 wherein in the adding step, a flocculent is added.

30. The process of claim 29 wherein the flocculent is selected from aluminum sulfate, lime, iron salts, polyelectrolytes, or a mixtures thereof.

31. A process for reducing the concentration of viruses in wastewater, said process comprising the acts of:
- adding an agglomeration-promoting agent to wastewater to form suspended aggregates which include viruses; and
- passing the wastewater with aggregates through a cloth filter to reduce the concentration of viruses.

32. The process of claim 31 wherein the act of passing the wastewater through a cloth filter includes reducing the concentration of viruses by greater than about 50%.

33. The process of claim 31 wherein the act of passing the wastewater through a cloth filter includes reducing the concentration of viruses by greater than about 90%.

34. The process of claim 31 wherein the cloth filter is constructed of a material including random web needled polyester felt.

35. The process of claim 31 wherein the cloth filter is characterized by an average free passage size through the cloth filter of greater than about 5 microns.

36. The process of claim 31 wherein the act of adding an agglomerate-promoting agent includes adding a coagulant to the wastewater.

37. The process of claim 36 wherein the coagulant is selected from iron salts, aluminum salts, activated silica, bentonite, sodium chloride, cationic polyelectrolytes, or mixtures thereof.

38. The process of claim 31 wherein the act of adding an agglomerate-promoting agent includes adding a flocculent to the wastewater.

39. The process of claim 38 wherein the flocculent is aluminum sulfate, lime, iron salts, polyelectrolytes, or a mixture thereof.

40. A process for reducing the concentration of viruses in wastewater, the process comprising the acts of:
- adding an agglomerate-promoting agent to wastewater to form solids aggregates which include viruses; and
- passing the wastewater and aggregates through a filter to reduce the concentration of viruses in the wastewater, wherein the filter is a cloth filter fabricated from material including a random web polyester felt.

41. The process of claim 40 wherein said filter is fabricated from a cloth material having a free passage size through the cloth of greater than 5 microns.

* * * * *